United States Patent [19]
Kurio

[11] 3,849,038
[45] Nov. 19, 1974

[54] ROTARY PISTON TYPE ENGINE
[75] Inventor: Noriyuki Kurio, Hiroshima, Japan
[73] Assignee: Toyo Kogyo Co., Ltd., Hiroshima, Japan
[22] Filed: Nov. 21, 1973
[21] Appl. No.: 417,940

[52] U.S. Cl. ............................................. 418/142
[51] Int. Cl. ............................................ F01c 19/08
[58] Field of Search ................. 418/142, 97, 98, 99

[56] References Cited
UNITED STATES PATENTS
| | | | |
|---|---|---|---|
| 2,979,042 | 4/1961 | Bentele | 418/142 |
| 3,265,045 | 8/1966 | Bensinger et al. | 418/142 |
| 3,464,394 | 9/1969 | Satoh | 418/142 |

Primary Examiner—William L. Freeh
Assistant Examiner—O. T. Sessions
Attorney, Agent, or Firm—Fleit & Jacobson

[57] ABSTRACT

A rotary piston type engine including a casing which comprises a center housing having a trochoidal inner peripheral wall and a pair of side housings secured to the opposite sides of the center housing, at least one of the side housings being provided with air intake port means, a substantially triangular rotor rotatably disposed in the casing, said rotor being provided at each of the opposite sides thereof with oil seal means, the oil seal means at the side of the rotor facing to the side housing having said intake port means comprising a pair of radially spaced seal rings, the radially outer seal ring being disposed at such a location that the outer envelope of the traces thereof is radially outside of the radially inner extremity of the intake port means, and the radially inner seal ring being disposed at such a location that the outer envelope of the traces thereof is radially inside of the radially inner extremity of the intake port means, so that blow-by gas entrapped in the space between said oil seal rings is discharged to the intake port means.

2 Claims, 3 Drawing Figures

ROTARY PISTON TYPE ENGINE

The present invention relates to a rotary piston type engine and more particularly to a rotary piston engine of such a type that includes a casing comprising a center housing having a trochoidal inner peripheral wall and a pair of side housings secured to the opposite sides of the center housing, and a substantially triangular rotor rotatably disposed in said casing with apices in sliding engagement with said inner peripheral wall of the center housing, whereby working chambers of variable volume are defined between the inner peripheral wall of the center housing and the triangular rotor.

In such a type of rotary piston engine, one of the side housings is usually provided with an air intake port and the rotor carriers, at each of its opposite sides, side seal means which is in slidable sealing engagement with the inner surface of the adjacent side housing, whereby said air intake port is opened only to the working chamber which is in the intake stroke. The rotor is further provided with annular oil seal means for preventing lubricating oil from entering into the working chambers.

The present invention has an object to provide in such a type of rotary piston engine means for returning blow-by gas into an air intake system of the engine.

According to the present invention, the above object can be achieved by a rotary piston type engine including a casing which comprises a center housing having a trochoidal inner peripheral wall and a pair of side housings secured to the opposite sides of the center housing, and a rotor having a substantially triangular outer periphery and disposed in said casing for rotation therein with apices sliding engagement with the inner peripheral wall of the center housing so that working chambers of variable volume are defined between the inner peripheral wall of the center housing and the rotor, each of said side housing having an inner surface opposing to said rotor and at least one of said side housings being provided with air intake port means opening to the inner surface thereof, said rotor having opposite side surfaces each provided with side seal means disposed substantially along the triangular outer pheiphery of the rotor, and oil seal means disposed at diametrically inner portion of the rotor, said side and oil seal means being in slidable sealing engagement with the inner surface of the adjacent side housing, the improvement comprising the fact that said oil seal means on the side of the rotor facing to the side housing having said intake port means comprises at least a pair of diametrically spaced oil seal members, one being disposed at such a location that the outer envelope of the traces of the member is radially outside of the radially inner extremity of the intake port means, and the other at such a location that the outer envelope of the traces thereof is radially inside of the radially inner extremity of the intake port means so that blow-by gas entrapped in the space between said oil seal members is returned to the intake port means. Preferably, the oil seal members comprise a pair of circular oil seal rings co-axially disposed with each other.

The above and other objects and features of the present invention will become apparent from the following descriptions of a preferred embodiment taking reference to the accompanying drawings, in which.

Figure 1:
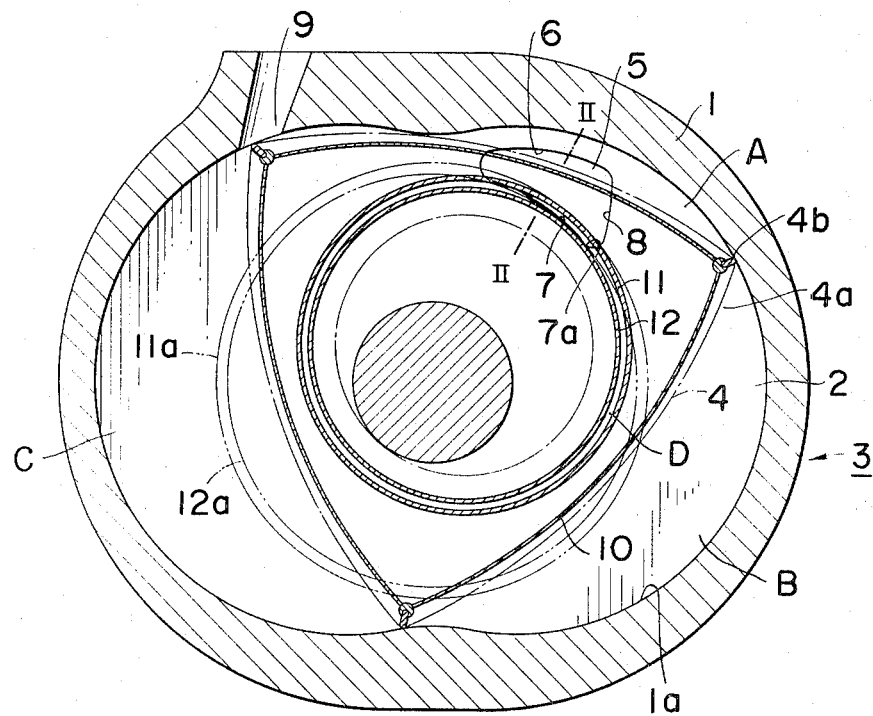
FIG. 1 is a sectional view of a rotary piston type engine in accordance with the present invention.
Figure 2:
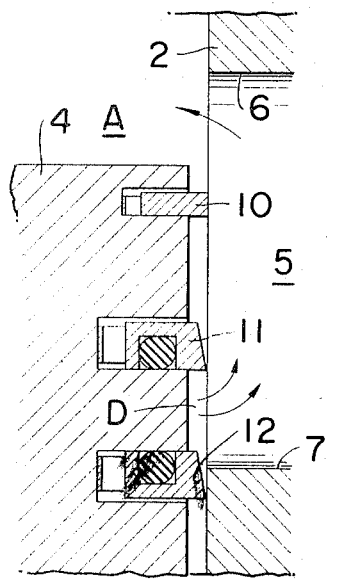
FIG. 2 is an enlarged sectional view taken substantially along the line II—II in FIG. 1.
Figure 3:
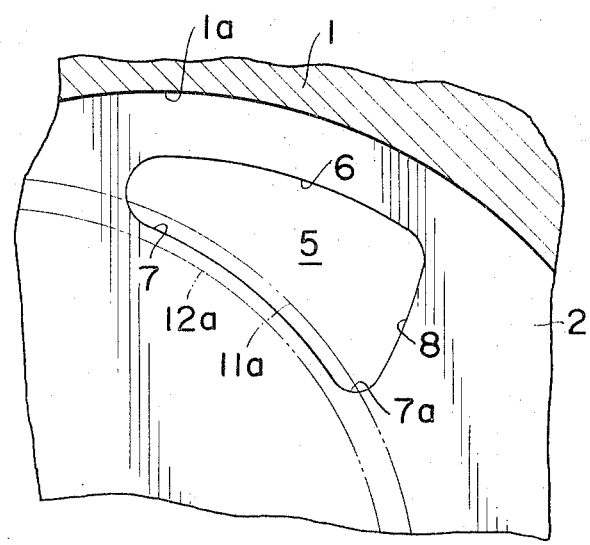
FIG. 3 is an enlarged fragmentary view of the engine shown in FIG. 1.

Referring now to the drawings, the rotary piston engine illustrated therein includes a casing 3 which is constituted by a center housing 1 and a pair of side housings 2 secured to the opposite sides of the center housing 1. In the drawings, only one of the side housings 2 is shown. The center housing 1 has a trochoidal inner peripheral wall 1a to define a cavity for receiving a substantially triangular rotor 4. The rotor 4 has a substantially triangular outer periphery 4a with apices provided with apex seals 4b which are slidable sealing engagement with the inner peripheral wall 1a of the center housing 1. The side housing 2 is provided with an air intake port 5 which has a radially outward periphery 6, a radially inward periphery 7 and a downstream side periphery 8. The center housing 1 is provided with an exhaust port 9. On each of the side surfaces of the rotor 4, there is provided side seals 10 substantially along the outer pheriphery 4a of the rotor 4. The side seals 10 is in slidable sealing engagement with the inner surface of the adjacent side housing 2. Thus, three working chambers A, B and C are defined between the inner peripheral wall 1a of the center housing 1 and the periphery 4a of the rotor 4. As the rotor 4 rotates, the intake port 5 is opened to the working chamber A which is in the intake stroke. Since the operation of the rotary piston engine of this type is well known in the art, it will not be described in detail.

In the illustrated embodiment of the present invention, the rotor 4 is provided at the side facing to the side housing 2 having the intake port 5 with a pair of circular oil seal rings 11 and 12 which are radially spaced apart and co-axial with each other. The oil seal rings 11 and 12 are in slidable sealing engagement with the inner surface of the adjacent side housing 2. According to the present invention, the outer oil seal ring 11 is disposed at such a location that the outer envelope 11a of the traces thereof is at the radially outward side of the radially inner extremity 7a of the intake port 5. Further, the inner oil seal ring 12 is disposed at such a location that the outer envelope 12a of the traces thereof is at the radially inward side of the radially inner extremity 7a of the intake port 5.

The oil seal rings 11 and 12 are primarily provided for preventing lubricant oil from entering through the side seals 10 into the working chambers A, B and C. According to the present invention, the annular space D between the oil seal rings 11 and 12 serves to retain blow-by gas leaking from the working chambers which are in the compression and combustion strokes. The space D is intermittently brought into communication with the intake port 5 as the rotor 4 rotates, so that the blow-by gas entrapped in the space D is discharged into the intake port 5. Since the substantial part of the lubricant oil is blocked by the inner oil seal ring 12, oil consumption is not appreciably increased in the arrangement of the present invention.

The present invention has thus been shown and described with reference to a preferred embodiment, however, it should be noted that the invention is in no way limited to the details of the illustrated structure but changes and modifications can be made without departing from the scope of the appended claims.

I claim:

1. A rotary piston type engine including a casing which comprises a center housing having a trochoidal inner peripheral wall and a pair of side housings secured to the opposite sides of the center housing, and a rotor having a substantially triangular outer periphery and disposed in said casing for rotation therein with apices in sliding engagement with the inner peripheral wall of the center housing so that working chambers of variable volume are defined between the inner peripheral wall of the center housing and the rotor, each of said side housings having an inner surface opposing to said rotor and at least one of said side housings being provided with air intake port means opening to the inner surface thereof, said rotor having opposite side surfaces each provided with side seal means disposed substantially along the triangular outer periphery of the rotor, and oil seal means disposed at diametrically inner portion of the rotor, said side and oil seal means being in slidable sealing engagement with the inner surface of the adjacent side housing, the improvement comprising the fact that said oil seal means on the side of the rotor facing to the side housing having said intake port means comprises at least a pair of diametrically spaced oil seal members, one being disposed at such a location that the outer envelope of the traces of the member is radially outside of the radially inner extremity of the intake port means, and the other at such a location that the outer envelope of the traces thereof is radially inside of the radially inner extremity of the intake port means.

2. A rotary piston type engine in accordance with claim 1 in which said oil seal members are circular oil seal rings co-axially disposed with each other.

* * * * *

UNITED STATES PATENT OFFICE
CERTIFICATE OF CORRECTION

Patent No. 3,849,038            Dated November 19, 1974

Inventor(s) NORIYUKI KURIO

It is certified that error appears in the above-identified patent and that said Letters Patent are hereby corrected as shown below:

Please insert on title page:

--[30]    FOREIGN APPLICATION PRIORITY DATA

November 27, 1972     Japan..............136847--

Signed and sealed this 18th day of March 1975.

(SEAL)
Attest:

RUTH C. MASON
Attesting Officer

C. MARSHALL DANN
Commissioner of Patents
and Trademarks